US005628378A

United States Patent [19]
Saito et al.

[11] Patent Number: 5,628,378
[45] Date of Patent: May 13, 1997

[54] TRACTION CONTROL DEVICE FOR VEHICLE

[75] Inventors: Wataru Saito; Kenji Akuzawa; Hiromi Inagaki, all of Wako, Japan

[73] Assignee: Honda Giken Kogyo Kabushiki Kaisha, Tokyo, Japan

[21] Appl. No.: 402,478

[22] Filed: Mar. 10, 1995

[51] Int. Cl.⁶ .................................................. B60K 28/16
[52] U.S. Cl. .................................. 180/197; 364/426.033
[58] Field of Search ........................ 180/197; 364/426.01, 364/426.03, 424.1; 123/416, 417

[56] References Cited

U.S. PATENT DOCUMENTS

| | | | |
|---|---|---|---|
| 5,093,790 | 3/1992 | Shiraishi et al. | 180/197 X |
| 5,265,693 | 11/1993 | Rees et al. | 180/197 |
| 5,390,116 | 2/1995 | Hayafune | 364/424.1 |
| 5,405,301 | 4/1995 | Yagi et al. | 180/197 X |
| 5,428,541 | 6/1995 | Miyata et al. | 364/426.03 |
| 5,519,617 | 5/1996 | Hughes et al. | 364/426.03 |

FOREIGN PATENT DOCUMENTS 3-279637  12/1991  Japan .

*Primary Examiner*—Kevin Hurley
*Attorney, Agent, or Firm*—Nikaido, Marmelstein, Murray & Oram LLP

[57] ABSTRACT

A traction control device for a vehicle decreases the driving torque for a driving wheel connected to a power source through an automatic transmission in response to the detection of an excessively slipping tendency of the driving wheel at the time of acceleration of the vehicle. In the traction control device, the shifting motion of the automatic transmission is predicted by a shifting predicting means based on operational parameters of the power source and a shifting characteristic of the automatic transmission. The operational parameters of the power source are assumed by an foreseeing means based on values before shifting of the operational parameters of the power source and operational parameters of the vehicle as well as gear shift positions detected before and after shifting by a gear shift position detecting means. An actuator for changing the driving torque for the driving wheel is operated by a driving torque control section for determining a control quantity of driving torque based on detection values before shifting and assumed values after shifting of the operational parameters of the power source. As a result, the driving wheel speed is stabilized immediately at the completion of the shifting operation of the automatic transmission.

1 Claim, 15 Drawing Sheets

TRACTION CONTROL DEVICE FOR VEHICLE

BACKGROUND OF THE INVENTION

1. Field of the Invention

The present invention relates to a traction control device for a vehicle, which decreases a driving torque for a driving wheel connected to a power source through an automatic transmission in response to the detection of an excessively slipping tendency of the driving wheel at the time of acceleration of the vehicle.

2. Description of the Prior Art

Such a system is conventionally known, for example, from Japanese patent Application Laid-open No. 279637/91.

In the known traction control device, if an attention is given to the shifting of the automatic transmission, a variation in driving wheel speed caused with the shifting is suppressed by changing parameters of a control system, after the shifting is actually produced, or after a signal indicative of the shifting is received. In this manner, the known traction control device tries to suppress the variation in driving wheel speed after the shifting operation is actually conducted and for this reason, it can not be avoided that a little delay is produced until the control system is converged into a stabilization.

SUMMARY OF THE INVENTION

Accordingly, it is an object of the present invention to provide a traction control device for a vehicle, wherein the shifting operation of the automatic transmission is predicted, so that the driving wheel speed is stabilized immediately at the completion of the shifting.

To achieve the above object, according to the present invention, there is provided a traction control device for a vehicle, which decreases the driving torque for a driving wheel connected to a power source through an automatic transmission in response to the detection of an excessively slipping tendency of the driving wheel at the time of acceleration of the vehicle, the system comprising a gear shift position detecting means for detecting the shift stage of the automatic transmission, a shifting predicting means for predicting the shifting motion of the automatic transmission based on operational parameters of the power source and a shifting characteristic of the automatic transmission, an foreseeing means for assuming the operational parameters of the power source after shifting, based on values before shifting of the operational parameters of the power source and operational parameters of the vehicle and the gear shift positions of the automatic transmission before and after shifting, a driving torque control section for determining a control quantity of driving torque for the driving wheel based on detection values before shifting and assumed values after shifting of the operational parameters the power source, and an actuator operated in accordance with the control quantity determined in the driving torque control section to change the driving torque for the driving wheel.

With such arrangement, it is possible to predicting the shifting operation of the automatic transmission to control the driving wheel driving torque during shifting, so that the driving wheel speed is stabilized immediately at the completion of the shifting, thereby suppressing a variation in driving wheel speed due to the shifting to perform a stable traction control.

The above and other objects, features and advantages of the invention will become apparent from the following description of the preferred embodiment taken in conjunction with the accompanying drawings.

BRIEF DESCRIPTION OF THE DRAWINGS

FIGS. 1 to 17 illustrate a preferred embodiment of the present invention, wherein FIG. 1 is a diagrammatic illustration of a driving system and a braking system in a front wheel drive vehicle;

FIG. 2 is a diagram illustrating the arrangement of a braking fluid pressure circuit;

FIG. 3 is a block diagram illustrating the arrangement of a control unit for a traction control;

FIG. 4 is a block diagram illustrating the arrangement of a slip detecting means;

FIG. 5 is a block diagram illustrating the arrangement of an input torque detecting means;

FIG. 6 is a graph illustrating the relationship between the slip ratio of the torque converter and the absorbed torque;

FIG. 7 is a graph illustrating the relationship between the slip ratio of the torque converter and the torque ratio;

FIG. 8 is a block diagram illustrating the arrangement of a throttle control section;

FIG. 9 is a block diagram illustrating the arrangement of a brake control section;

FIG. 10 is a graph illustrating one example of variations in vehicle speed and throttle opening degree in the prediction of a shifting;

FIG. 11 is a block diagram illustrating the arrangement of a shifting-correspondence throttle control section;

FIG. 12 is a graph illustrating a characteristic of target throttle opening degree set during shifting;

FIG. 13 is a block diagram illustrating the arrangement of a shifting-correspondence brake control section;

FIG. 14 is a graph illustrating a characteristic of target braking pressure set during shifting;

FIG. 15 is a graph illustrating an example of inertia-correspondence target braking pressure set during shifting;

FIG. 16 is a flow chart illustrating a procedure for judgment by an output judging means; and FIG. 17 is a graph illustrating a traction control characteristic according to a variation in driven wheel speed.

DESCRIPTION OF THE PREFERRED EMBODIMENTS

Figure 1:
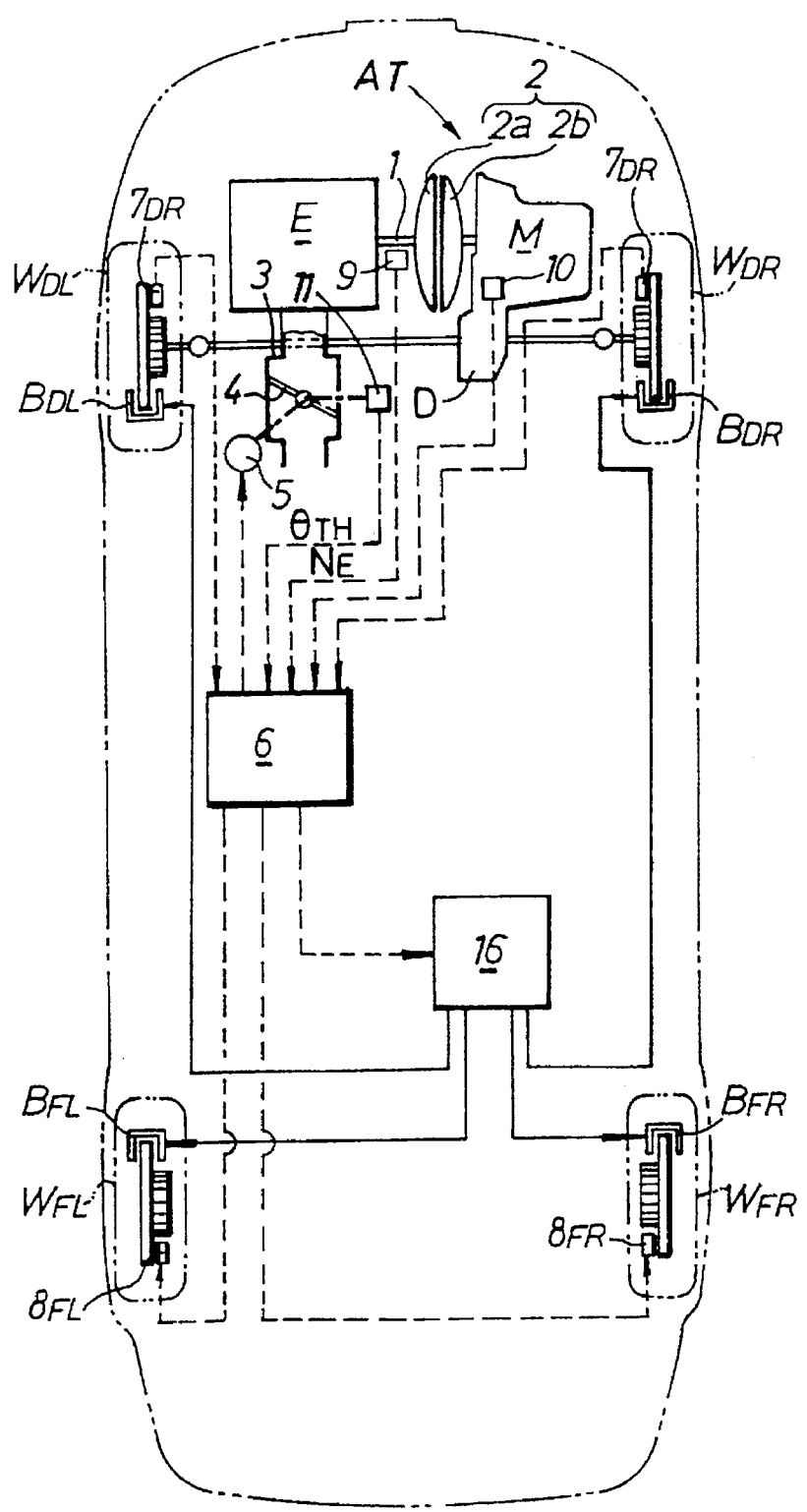

Referring first to FIG. 1, an engine E, which is a power source mounted on a front wheel drive vehicle, is connected to an automatic transmission AT. The automatic transmission AT includes a torque converter 2 having a pump 2a connected to a crankshaft 1 of the engine E, and an auxiliary transmission M connected to a turbine 2b of the torque converter 2b, so that a power delivered from the automatic transmission AT, i.e., the auxiliary transmission M is transmitted through a differential D to left and right driven wheels $W_{DL}$ and $W_{DR}$ which are left and right front wheels. A throttle valve 4 is openably and closably disposed in an intermediate portion of an intake pipe 3 in the engine E for adjusting the amount of intake air flowing through the intake pipe 3 to control the output from the engine E. The throttle valve 4 is opened and closed by an actuator such as a step motor 5.

Connected to a control unit 6 for carrying out a traction control of the vehicle are follower wheel speed detectors $8_{FL}$ and $8_{FR}$ for detecting speeds of left and right follower wheels $W_{FL}$ and $W_{FR}$ which are left and right rear wheels, a revolution-number detector 9 for detecting a number $N_E$ of revolutions of the engine E, a gear position detector 10 for detecting a gear position of the auxiliary transmission M in the automatic transmission AT, and a throttle opening degree detector 11 for an opening degree $\theta_{TH}$ of the throttle valve 4.

A braking fluid pressure is supplied from a braking fluid pressure circuit 16 to wheel brakes $B_{DL}$ and $B_{DR}$ mounted on the left and right driven wheels $W_{DL}$ and $W_{DR}$, respectively and wheel brakes $B_{FL}$ and $B_{FR}$ mounted to the left and right follower wheels $W_{FL}$ and $W_{FR}$, respectively.

Figure 2:
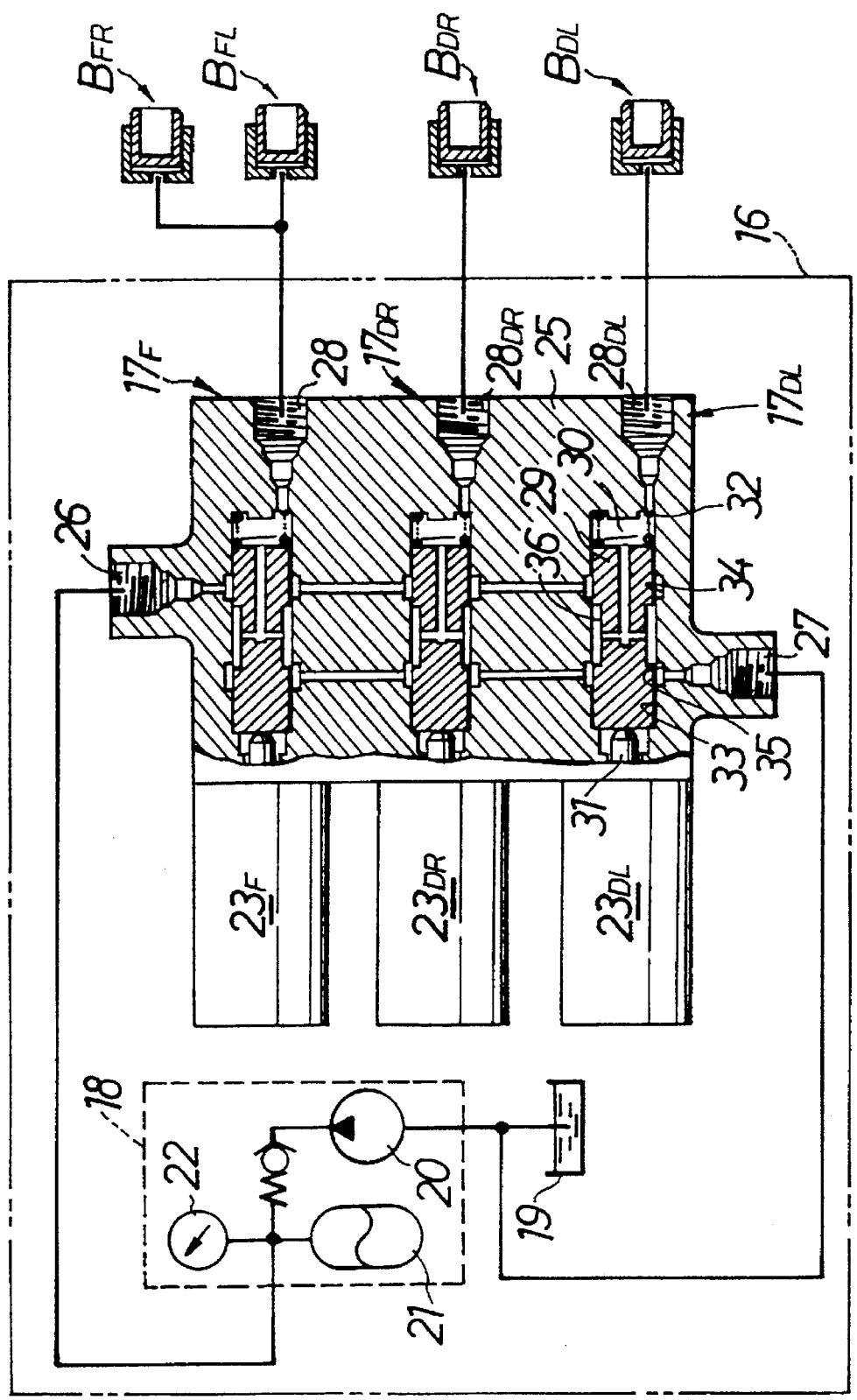

Referring to FIG. 2, the braking fluid pressure circuit 16 includes a modulator $17_{DL}$ corresponding to the wheel brake $B_{DL}$ for the left driven wheel, a modulator $17_{DR}$ corresponding to the wheel brake $B_{DR}$ for the right driven wheel, a modulator $17_F$ commonly corresponding to the brakes $B_{FL}$ and $B_{FR}$ for the left and right follower wheels, and a fluid pressure source 18 common to the modulators $17_{DL}$, $17_{DE}$ and $17_F$.

The fluid pressure source 18 includes a fluid pressure pump 20 for pumping a working fluid from a reservoir 19, an accumulator 21 connected to the fluid pressure pump 20, and a pressure switch 22 for controlling the operation of the fluid pressure pump 20.

The modulators $17_{DL}$, $17_{DR}$ and $17_F$ are juxtaposed in parallel to one another in a common housing 25 and has the basically same structure. Therefore, only the modulator $17_{DL}$ will be described below in detail, and the detailed description of the modulators $17_{DR}$ and $17_F$ is not omitted.

The housing 25 is provided with an input port 26 connected to the fluid pressure source 18, a releasing port 27 leading to the reservoir 19, and three output ports $28_{DL}$, $28_{DR}$ and $28_F$. The output port $28_{DL}$ is connected to the left driven wheel brake $B_{DL}$; the output port $28_{DR}$ is connected to the right driven wheel brake $B_{DR}$, and the output port $28_F$ is connected commonly to the left and right follower wheel brakes $B_{FL}$ and $B_{FR}$.

The modulator $17_{DL}$ includes a spool 29 slidably received in the housing 25, and a linear solenoid $23_{DL}$ as a driving means mounted to the housing 25 to urge the spool 28 in an axial direction. The linear solenoid $23_{DL}$ has a driving rod 31 coaxially abutting against one end of the spool 29, and an output chamber 30 is defined in the housing 25 and faced by the other end of the spool 29. Moreover, the output chamber 30 leads to the output port $28_{DL}$, and a return spring 32 is accommodated in the output chamber 30 for biasing the spool 29 toward the linear solenoid $23_{DL}$. Thus, the spool 29 normally abuts against the driving rod 31 under the action of a spring force of the return spring, so that the spool 29 and the linear solenoid $23_{DL}$ are operatively connected to each other.

The housing 25 has a cylinder bore 33 provided therein, in which the spool 29 is slidably received. An annular groove 34 leading to the input port 26 and an annular groove 35 leading to the input port 26 are provided at axially spaced-apart locations in an inner surface of the cylinder bore 33. An annular recess 36 leading to the output chamber 30 is provided in an outer surface of the spool 29. In accordance with the axially displacement caused by a relationship in strength between a thrust force of the linear solenoid $23_{DL}$ applied to an axially one end thereof and a fluid pressure force of the output chamber 30 to the axially other end thereof, the spool 29 is switched over between a state in which it permits the annular recess 36 to lead to the annular groove 34 to put the input port 26 and the output port 30, i.e., the output port $28_{DL}$ into communication with each other, and a state in which it permits the annular recess 36 to lead to the annular groove 35 to put the output chamber 30 and the releasing port 27 into communication with each other.

The linear solenoid $23_{DL}$ generates a thrust force corresponding to a quantity of input electricity, and the fluid pressure in the output chamber 30, i.e., the fluid pressure provided from the output port $28_{DL}$ to the left driven wheel brake $B_{DL}$ can be controlled to any value by controlling the quantity of electric power for energizing the linear solenoid $23_{DL}$.

Even with the other modulators $17_{DR}$ and $17_F$, the fluid pressure applied to each of the wheel brakes $B_{DR}$, $B_{FL}$ and $B_{FR}$ can be controlled by controlling the quantity of electric power for energizing each of the linear solenoid $23_{DR}$ and $23_F$, as with the modulator $17_{DL}$.

In the traction control of the vehicle, the operation of the step motor 5 as an actuator and the quantity of electric power for energizing each of the linear solenoids $23_{DL}$ and $23_{DR}$ as actuators in the modulators $17_{DL}$ and $17_{DR}$ corresponding to the left and right driven wheel brakes $B_{DL}$ and $B_{DR}$ are controlled by the control unit 6, and the construction of the control unit 6 will be described below.

Figure 3:
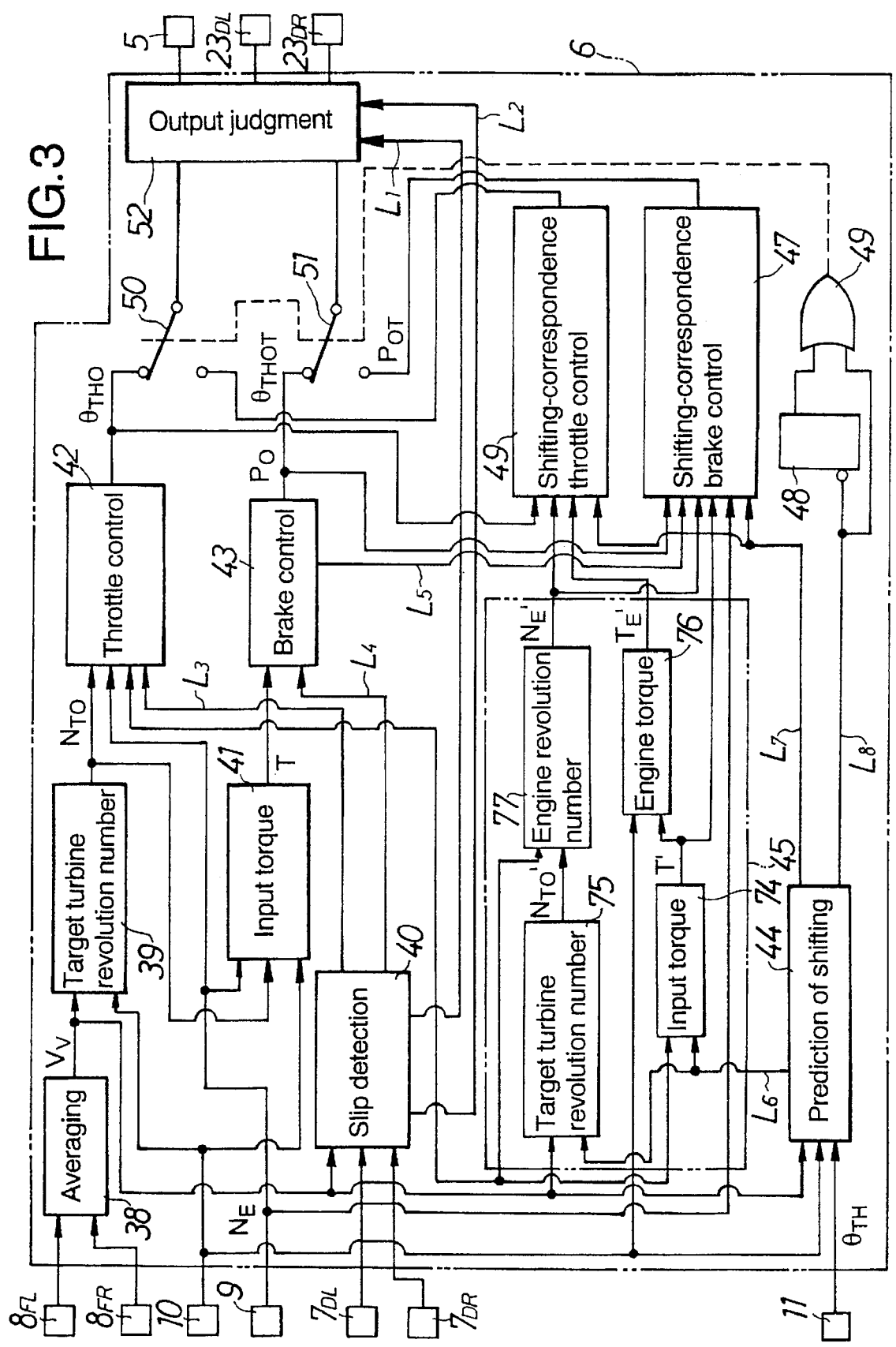

Referring to FIG. 3, the control unit 6 for carrying out the traction control includes: an averaging means 38 for averaging follower wheel speeds $V_{WFR}$ and $V_{WFR}$ determined by the left and right follower wheel speed detectors $8_{FL}$ and $8_{FR}$ to provide a vehicle speed $V_V$; a target turbine revolution-number determining means 39 for determining a target turbine revolution number $N_{TO}$ based on the vehicle speed $V_V$ and the gear position of the auxiliary transmission M determined by the gear position detector 10; a slip detecting means 40 for detecting whether or not the driven wheels $W_{DL}$ and $W_{DR}$ have been fallen into an excessively slipping tendency during acceleration of the vehicle, based on detection values detected by the left and right driven wheel speed detectors $7_{DL \ and \ 7DR}$ and the vehicle speed $V_V$; an input torque detecting means 41 for detecting an input torque applied to the differential D based on the target turbine revolution number $N_{TO}$, the engine revolution number $N_E$ determined by the revolution number detector 9, and the gear position determined by the gear position detector 10; a throttle control section 42 for determining the amount of step motor 5 operated in accordance with the target turbine revolution number $N_{TO}$, the engine revolution number $N_E$, the input torque determined by the input torque detecting means 41 and a result of detection by the slip detecting means 40; a brake control section 43 for determining the quantity of electric power for energizing the linear solenoid $23_{DL}$ and $23_{DR}$ of the modulators $17_{DL}$ and $17_{DR}$ corresponding to the left and right driven wheel brakes $B_{DL}$ and $B_{DR}$ in accordance with the input torque determined by the input torque detecting means 41 and the result of detection by the slip detecting means 40; a shifting predicting means 44 for predicting the shifting motion of the automatic transmission AT based on the vehicle speed $V_V$, the gear position determined by the gear position detector 10, the throttle opening degree $\theta_{TH}$ determined by the throttle opening degree detector 11 and the shifting characteristic of the automatic transmission AT; an estimating means 45 for estimating various operational parameters of the engine E after shifting, based on the vehicle speed $V_V$, the gear position determined by the gear position detector 10, the input torque determined by the input torque detecting means 41 and the gear position predicted after shifting by the shifting predicting means 44. The control unit 6 further includes: a shifting-correspondence throttle control section 46 as a driving torque control section for determining the amount of step motor 5 operated, based on an output from the throttle control section 42, an output from the foreseeing means 45 and an output from the shifting predicting means 44 before shifting; a shifting-correspondence brake control section 47 as a driving torque control section for determining a quantity of electric power for energizing the linear solenoids $23_{DL}$ and $23_{DR}$ before shifting, based on the output from an output from the brake control section 43, the output from the predicting means 45 and the output from the shifting predicting means 44 before shifting; a monostable circuit 48 which delivers a high level signal continuously for a predetermined time (e.g., 500 m sec.) from a time point of completion of the shifting predicted by the shifting predicting means 44; an OR gate 49 into which and output from the monostable circuit 48 and an output from the shifting predicting means 44 are supplied; a switch circuit 50 for alternatively selecting an output from the throttle control section 42 and an output from the shifting-correspondence throttle control section 46 in accordance with an output from the OR gate 49; a switch circuit 51 for alternatively selecting the output from the throttle control section 42 and an output from the shifting-correspondence brake control section 47 in accordance with the output from the OR gate 49; and an output judging means 52 which selects either one of outputs from the switch circuit 50 and 51 in accordance with an output from the slip detecting means 40 to supply it to the step motor 5 and the linear solenoids $23_{DL}$ and $23_{DR}$.

In the target turbine revolution number determining means 39, a calculation according to ($V_V$×gear ratio)=target turbine revolution number $N_{TO}$ is carried out, based on the vehicle speed $V_V$ and the gear position of the auxiliary transmission M determined by the gear position detector 10.

Figure 4:
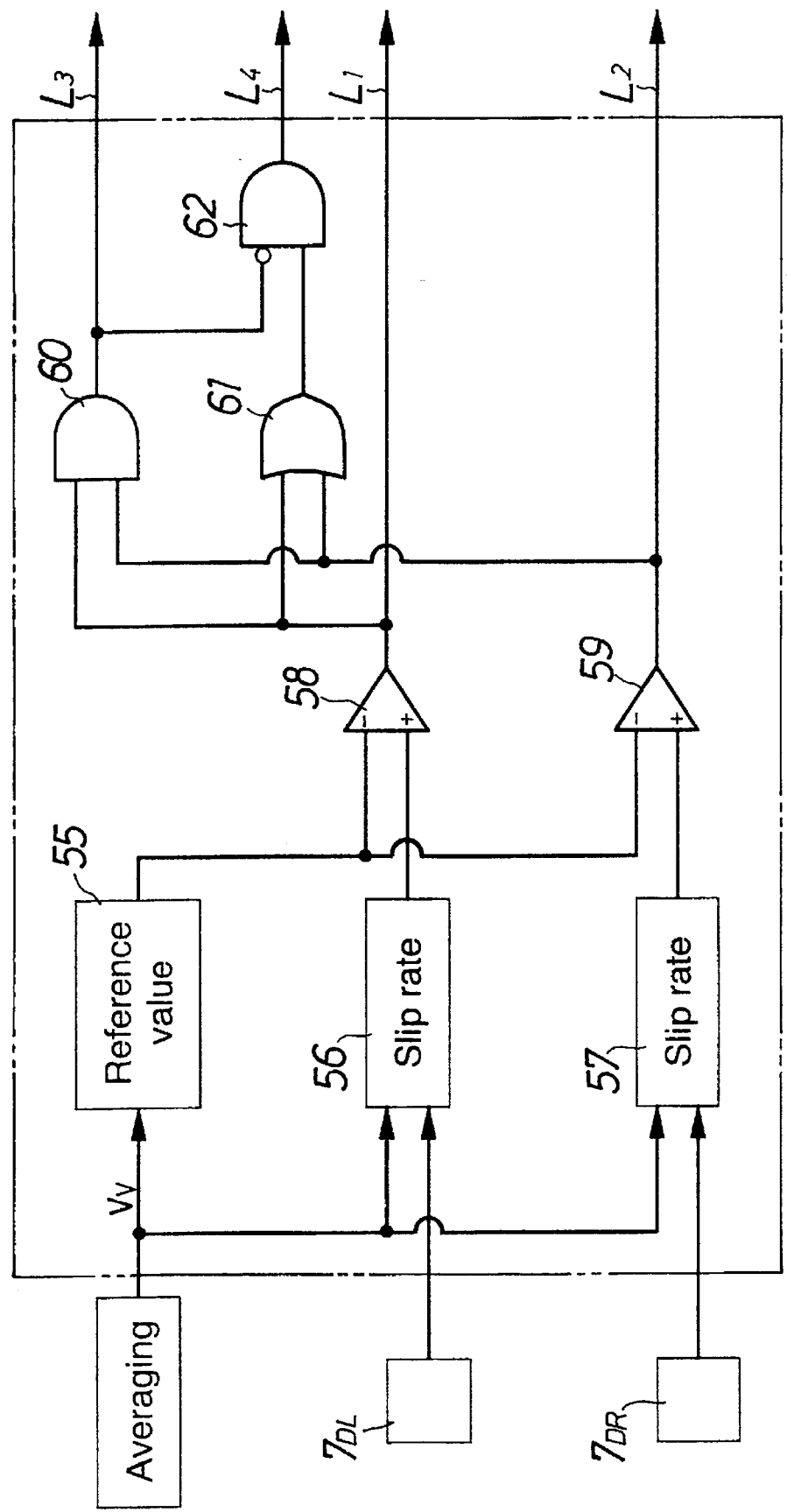

Referring to FIG. 4, the slip detecting means 40 includes: a reference value setting circuit 55 for setting a reference slip rate corresponding to the vehicle speed $V_V$ received from the averaging means 38; a left driven wheel slip rate calculating circuit 56 for calculating a slip rate of the left driven wheel $W_{DL}$ based on the left driven wheel speed received from the left driven wheel speed detector $7_{DL}$ and the vehicle speed $V_V$; a right driven wheel slip rate calculating circuit 57 for calculating a slip rate of the right driven wheel $W_{DR}$ based on the right driven wheel speed received from the right driven wheel speed detector $7_{DR}$; and the vehicle speed $V_V$, a comparator 58 for comparing outputs from the reference value setting circuit 55 and the left driven wheel slip rate calculating circuit 56; a comparator 59 for comparing the output from the reference value setting circuit 55 and an output from the right driven wheel slip rate calculating circuit 57; an AND gate 60 and an OR gate 61 to which outputs from the comparators 58 and 59 are supplied in parallel, respectively; and an AND gate 62, to one of input terminals of which an output from the AND gate 60 is supplied in an inverted manner and to the other input terminal of which an output from the OR gate 61 is supplied.

In each of the slip rate calculating circuits 56 and 57, a slip rate S is calculated according to a calculating expression, $\{S=(V_{WD}-V_V)/V_V\}$, wherein $V_{WD}$ is a driven wheel speed. In each of the comparators 58 and 59, the slip rate S determined in each of the slip rate calculating circuits 56 and 57 is compared with a reference slip rate set at the reference setting circuit 55. If the slip rate exceeds the reference slip rate, it is decided that the wheel has been fallen into an excessively slipping tendency is generated in the wheel, and a high level signal is delivered from each of the comparators 58 and 59. If the left driven wheel $W_{DL}$ has been fallen into the excessive slipping tendency, the high level signal is delivered from the comparator 58 to a line $L_1$. If the right driven wheel has been fallen into the excessive slipping tendency, the high level signal is delivered from the comparator 59 to a line $L_2$. If it is decided that both the driven wheels $W_{DL}$ and $W_{DR}$ are in the excessive slipping tendency, a high level signal is delivered from the AND gate 60 to a line $L_3$. If it is decided that one of the driven wheels $W_{DL}$ and $W_{DR}$ are in the excessive slipping tendency, a high level signal is delivered from the AND gate 62 to a line $L_4$.

Returning to FIG. 3, the lines $L_2$ and $L_2$ are connected to the output judging means 52, the line $L_3$ is connected to the throttle control section 42, and the line $L_4$ is connected to the brake control section 43.

Figure 5:
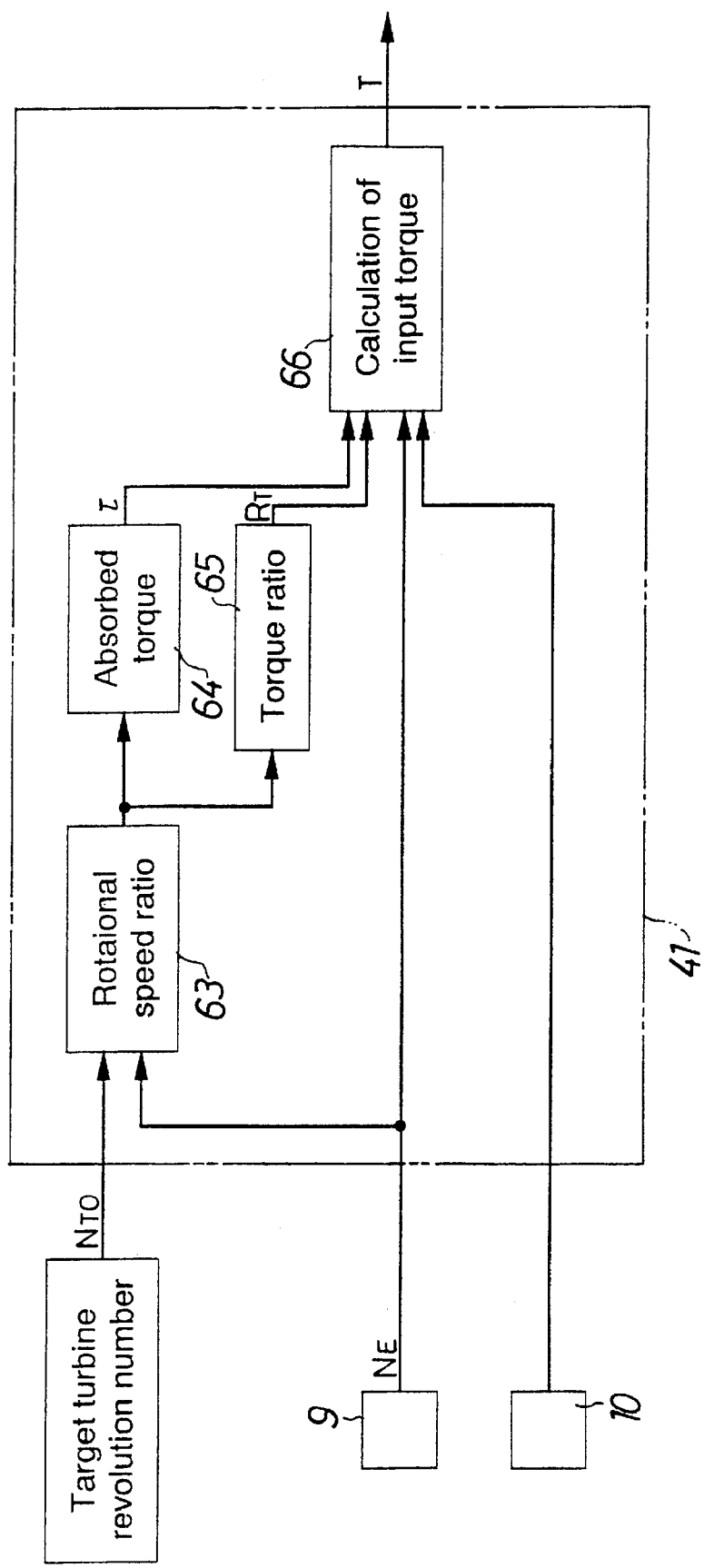

Referring to FIG. 5, the input torque detecting means 41 includes a rotational speed ratio calculating circuit 63, an absorbed-torque setting circuit 44, a torque ratio setting circuit 65 and an input torque calculating circuit 66.

Figure 6:
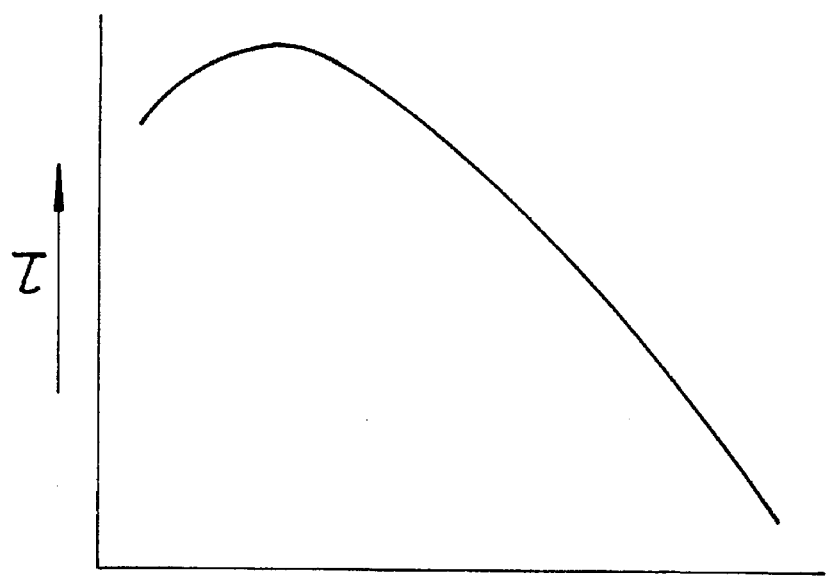
Figure 7:
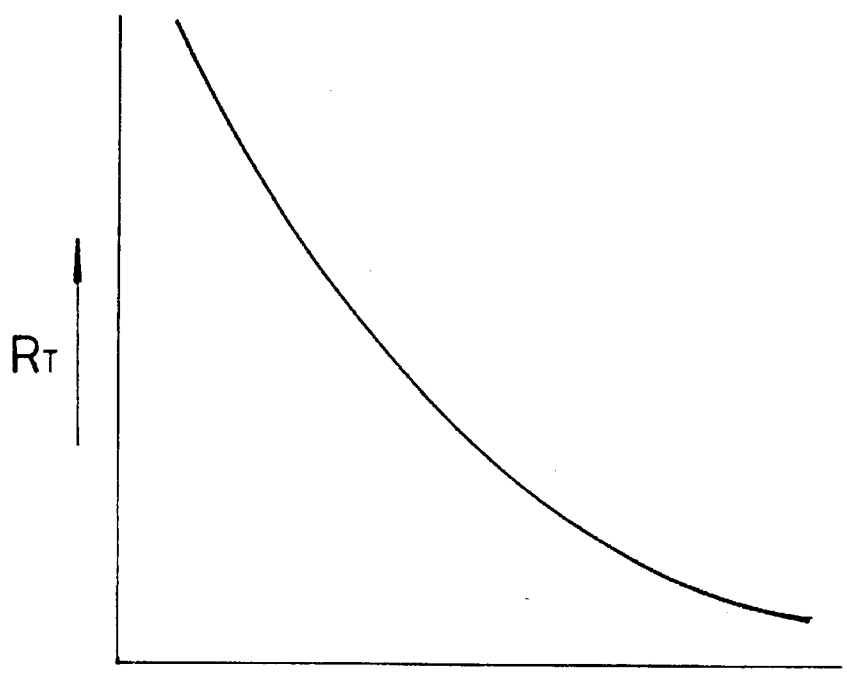

The rotational speed ratio calculating circuit 63 calculates a rotational speed ratio ($N_{TO}/N_E$) between the target turbine revolution number $N_{TO}$ determined by the target turbine revolution-number determining means 39 and the engine revolution number $N_E$ determined by the revolution-number detector 9, i.e., a slip ratio between the pump $2a$ and the turbine $2b$ in the torque converter 2 is calculated. The absorbed-torque setting circuit 64 determines an absorbed torque $\tau$ in the torque converter 2 in accordance with ($N_{TO}/N_E$), as shown in FIG. 6, and the torque ratio setting circuit 65 determines a torque ratio $R_r$ in accordance with ($N_{TO}/N_E$), as shown in FIG. 7.

The input torque calculating circuit 66 calculates an input torque $T_0$ applied to the differential D at the time when the transmission loss in the auxiliary transmission is zero (0), from the absorbed torque $\tau$ determined in the absorbed-torque setting circuit 64 and the torque ratio determined in the torque ratio setting circuit 65 according to a following first expression, $$T_0=(N_E/1000)^2\times\tau\times R_T \quad (1)$$

and corrects the input torque $T_0$ determined in the first expression (1) based on a transmission efficiency of the auxiliary transmission M corresponding to the gear position determined by the gear position detector 10 to deliver an input torque T to the differential D obtained after correction.

Figure 8:
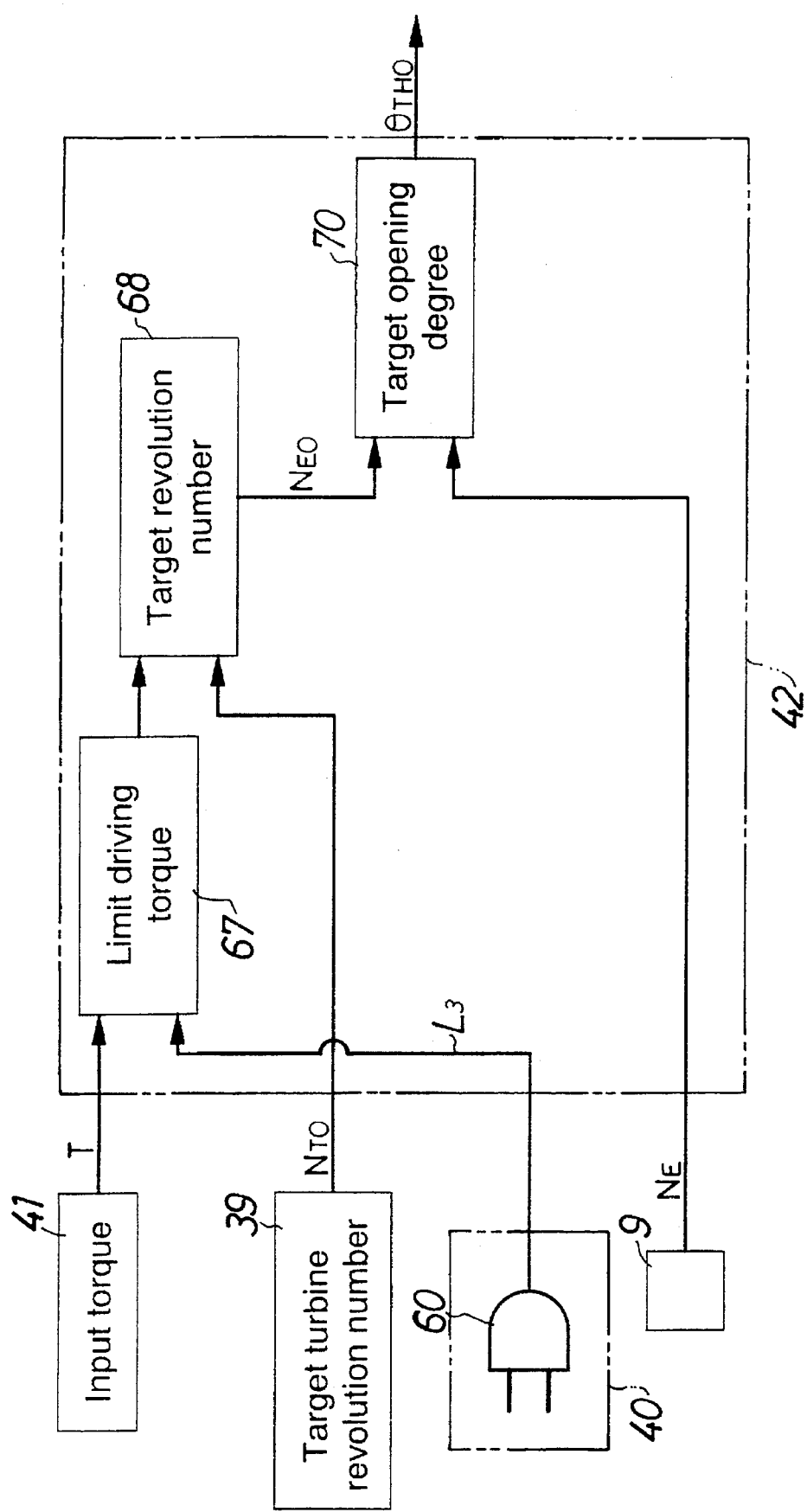

Referring to FIG. 8, the throttle control section 42 includes: a limit driving torque setting means 67 which maintains a current input torque T determined by the input torque detecting means 41 constant as a limit driving torque, when the signal from the line $L_3$ connected to the slip detecting means 40 becomes a high level, i.e., both of the left and right driven wheels $W_{DL}$ and $W_{DR}$ are fallen into the excessive slipping tendency; a target revolution-number determining means 68 for determining a target engine revolution number $N_{EO}$ based on the limit driving torque determined by the limit driving torque setting means 67 and the target turbine revolution number $N_{TO}$ determined by the target turbine revolution number determining means 39; and a target opening degree determining means 70 for determining a target opening degree $\theta_{THO}$ of the throttle valve 4 based on the comparing calculation of the engine revolution number $N_E$ determined by the revolution detector 9 and the target engine revolution number $N_{EO}$.

The limit driving torque setting means 67 determines an input torque T to the differential D as a limit value, when the both of the driven wheels $W_{DL}$ and $W_{DR}$ has been fallen into the excessively slipping tendency, and the target revolution number determining means 68 determines a target engine revolution number $N_{EO}$ from a map of rotational speed ratio to the target turbine revolution number $N_{TO}$ previously established in correspondence to the limit input torque T.

Figure 9:
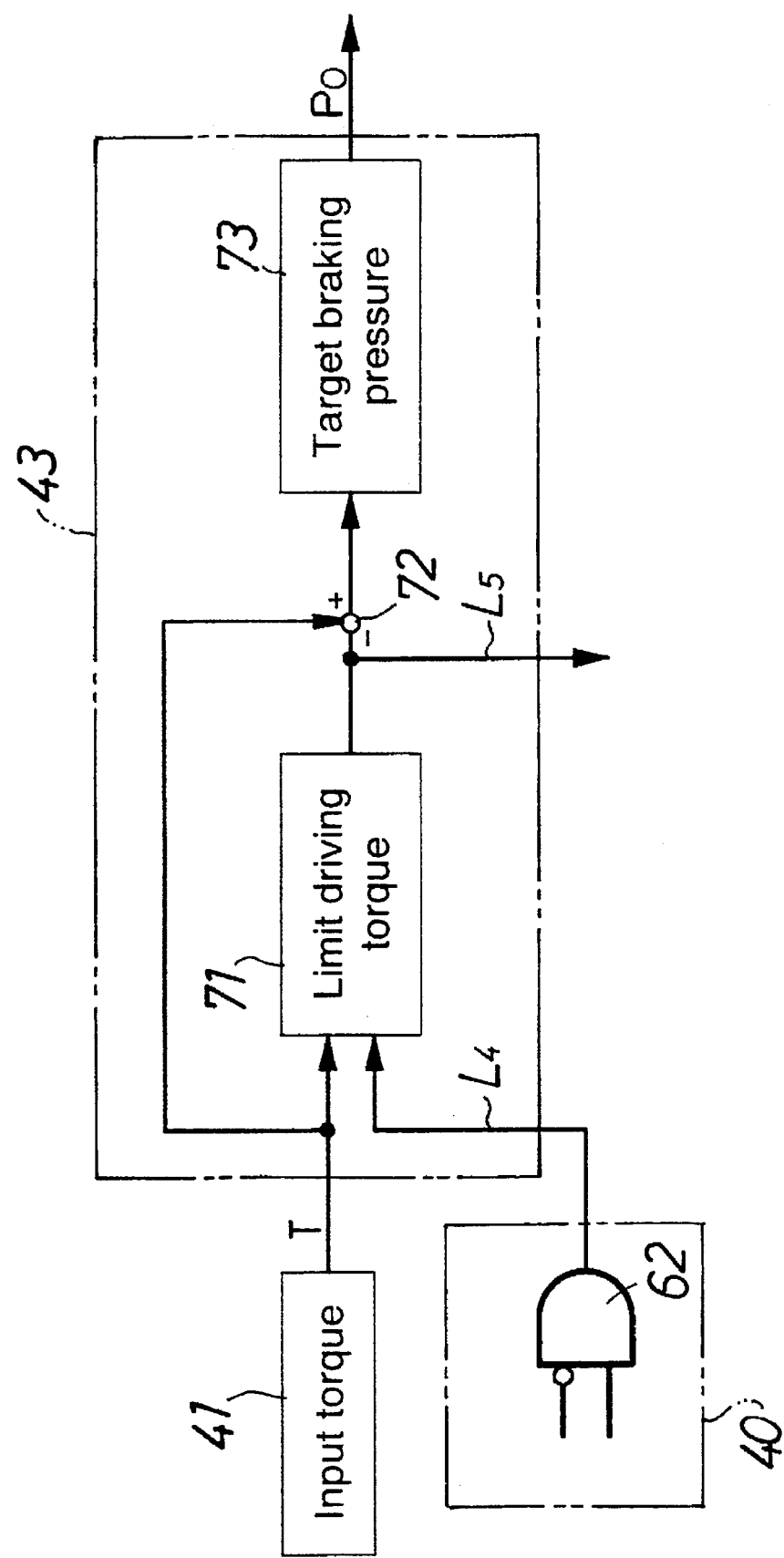

Referring to FIG. 9, the brake control section 43 includes: a limit driving torque setting means 71 which maintains an input torque determined by the input torque detecting means 41 constant as a limit driving torque, when the signal from the line $L_3$ connected to the slip detecting means 40 becomes a high level, i.e., either the left or right driven wheel $W_{DL}$ and $W_{DR}$ is fallen into the excessively slipping tendency; an adding point 72 serving as a subtracting means for subtracting the limit driving torque from the current input torque T determined by the input torque detecting means 41; and a target braking pressure determining means 73 for determining a target braking pressure $P_O$ based on an output from the adding point 72.

The limit driving torque determined by the limit driving torque setting means 71 is also provided to the shifting-correspondence brake control section 47 through a line $L_5$, as shown in FIG. 3.

Figure 10:
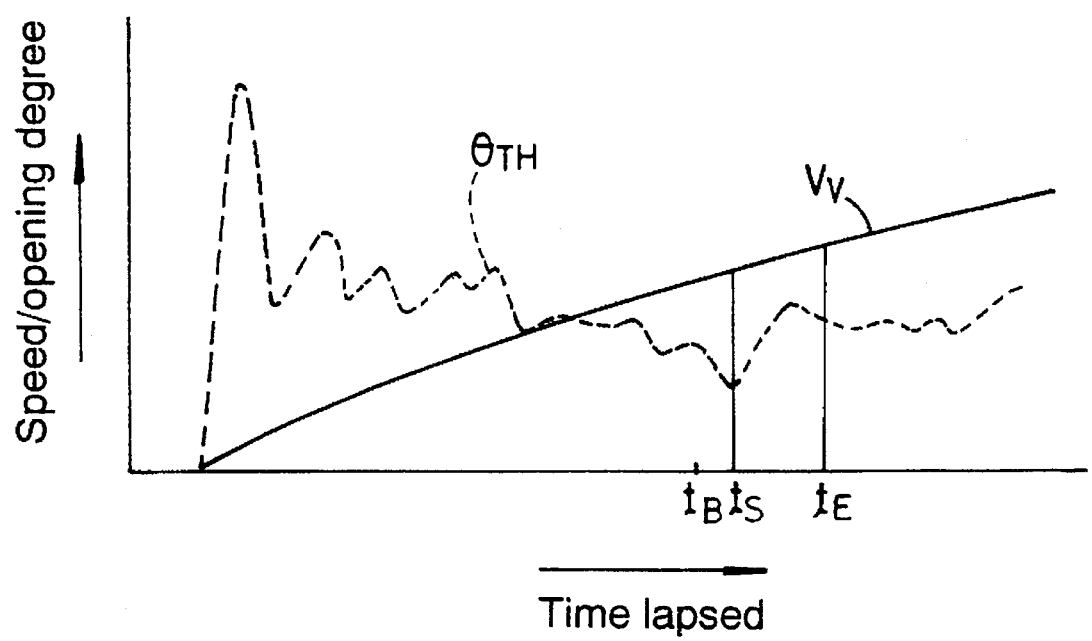

The shifting predicting means 44 predicts time points $t_S$ and $t_E$ of starting and ending of the shifting of the automatic transmission AT when the throttle opening degree $\theta_{TH}$ and the vehicle speed $V_V$ are being varied, as shown in FIG. 10, and predicts the gear position of the transmission obtained after shifting at a time point $t_B$ before the shifting-starting time point $t_S$. the gear position obtained after shifting is supplied from the shifting predicting means 44 through a line $L_6$ to the foreseeing means 45, and the shifting-starting time point $t_S$ and the shifting-ending time point $t_E$ are supplied from the shifting predicting means 44 through a line $L_7$ to the shifting-correspondence throttle control section 46 and the shifting-correspondence brake control section 47, as shown in FIG. 3. Further, a signal becoming a high level between the shifting-starting time point $t_S$ and the shifting-ending time point $t_E$ is delivered from the shifting-predicting means 44 to a line $L_8$, and a signal from the line $L_8$ is applied in an inverted manner to the monostable circuit 48 and also applied to the OR gate 49.

Referring again to FIG. 3, the foreseeing means 45 foresees an engine revolution number $N_E'$ after shifting, an input torque T' to the differential after shifting and an engine output torque $T_E'$ after shifting as the operational parameters of the engine E after shifting, based on the gear position after shifting predicted by the shifting-predicting means 44, and includes an input torque calculating circuit 74, a target turbine revolution number calculating circuit 75, an engine torque calculating circuit 76 and an engine revolution number calculating circuit 77.

The input torque calculating circuit 74 calculates an input torque T' after shifting, based on the gear position after shifting and the input torque T determined by the input torque detecting means 41. The target turbine revolution number calculating circuit 75 calculates a target turbine revolution number $N_{TO}'$ after shifting, based on the gear position after shifting and the vehicle speed $V_V$ determined by the averaging means 38. The engine torque calculating circuit 76 calculates an engine output torque $T_E'$ after shifting, based on the engine revolution number $N_E$ determined by the revolution number detector 9 and the gear position after shifting. And the engine revolution number calculating circuit 77 calculates an engine revolution number $N_E'$ after shifting, based on the input torque T determined by the input torque detecting means 41 and the target turbine revolution number $N_{TO}'$ after shifting.

Figure 11:
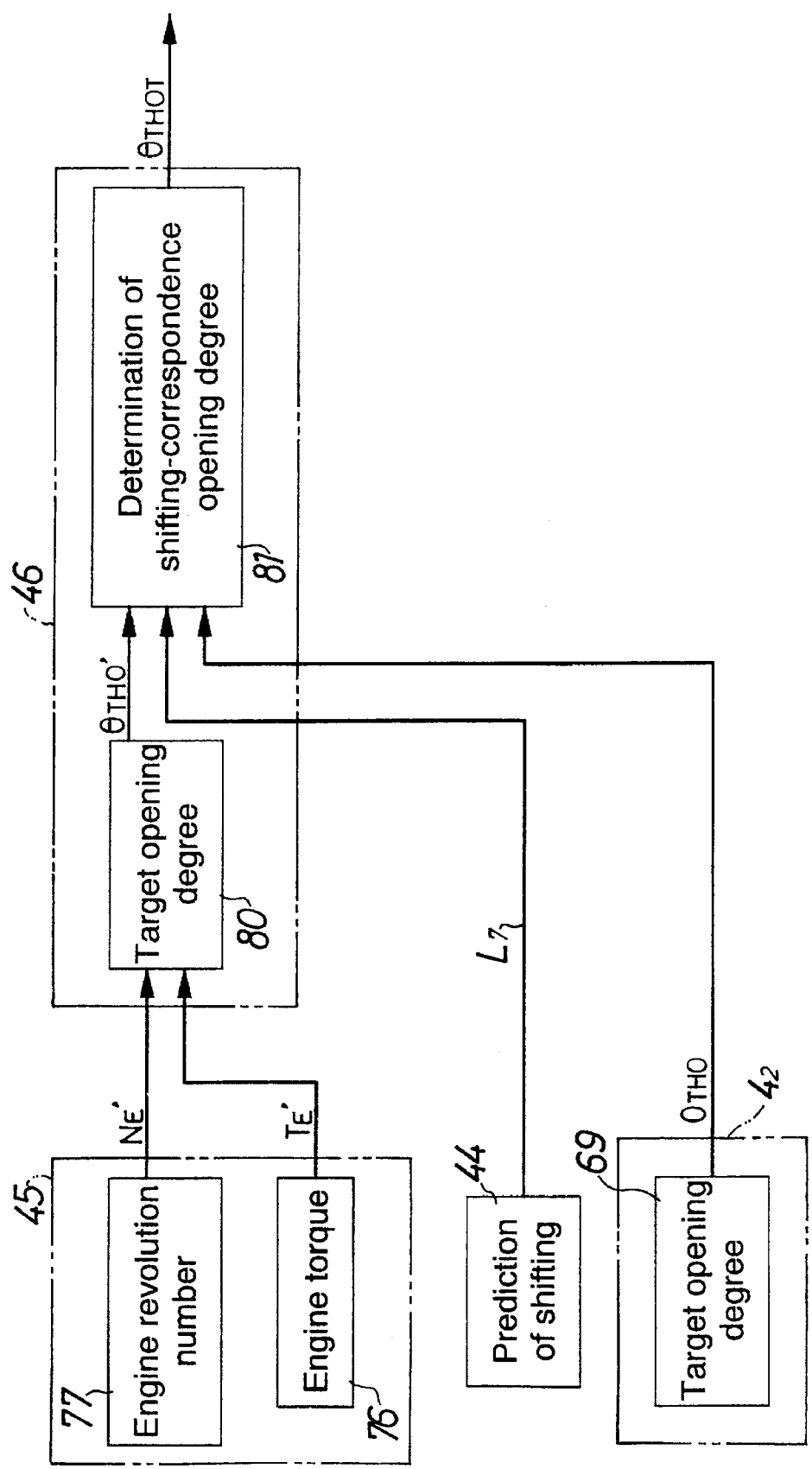

Referring to FIG. 11, the shifting-correspondence throttle control section 46 determines a target throttle opening degree $\theta_{THOT}$ during shifting, based on the target throttle opening degree $\theta_{THO}$ determined by the target opening degree determining means 70 of the throttle control section 42 at the start of the shifting, the engine output torque $T_E'$ and the engine revolution number $N_E'$ calculated as values after shifting in the engine torque calculating circuit 76 and the engine revolution number calculating circuit 77 in the foreseeing means 45, and the shifting-starting time point $t_S$ and the shifting-ending time point $t_E$ received from the shifting predicting means 44 through the line 7, and includes a target opening degree setting means 80 and a shifting-correspondence opening degree setting means 81.

Figure 12:
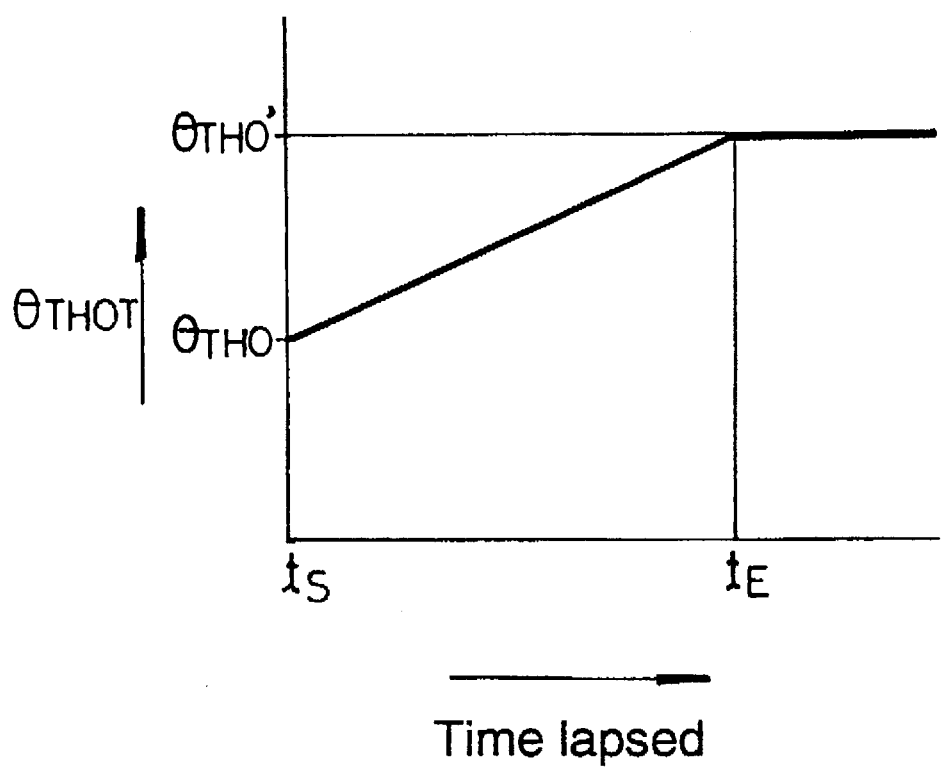

The target opening degree setting means 80 sets a target throttle opening degree $\theta_{THO}'$ Of the throttle valve 4 based on the engine output torque $T_E'$ and the engine revolution number $N_E'$ after shifting. As shown in FIG. 12, a target throttle opening degree $\theta_{THOT}$ during shifting is set in the shifting-correspondence opening degree setting means 81 in accordance with the target throttle opening degree $\theta_{THO}'$, the target throttle opening degree $\theta_{THO}$ determined by the target opening degree setting means 70 of the throttle control section 42, and the shifting-starting time point $t_S$ and the shifting-ending time point $t_E$ provided through the line $L_7$. More specifically, the target throttle opening degree $\theta_{THOT}$ during shifting is determined, so that the throttle opening degree equal to the target throttle opening degree $\theta_{THO}$ at the shifting-starting time point $t_S$ is changed to be equal to the target throttle opening degree $\theta_{THO}'$ at the shifting-ending time point $t_E$, and after the shifting-ending time point $t_S$, the target throttle opening degree $\theta_{THOT}$ is set at a value equal to $\theta_{THO}'$.

Figure 13:
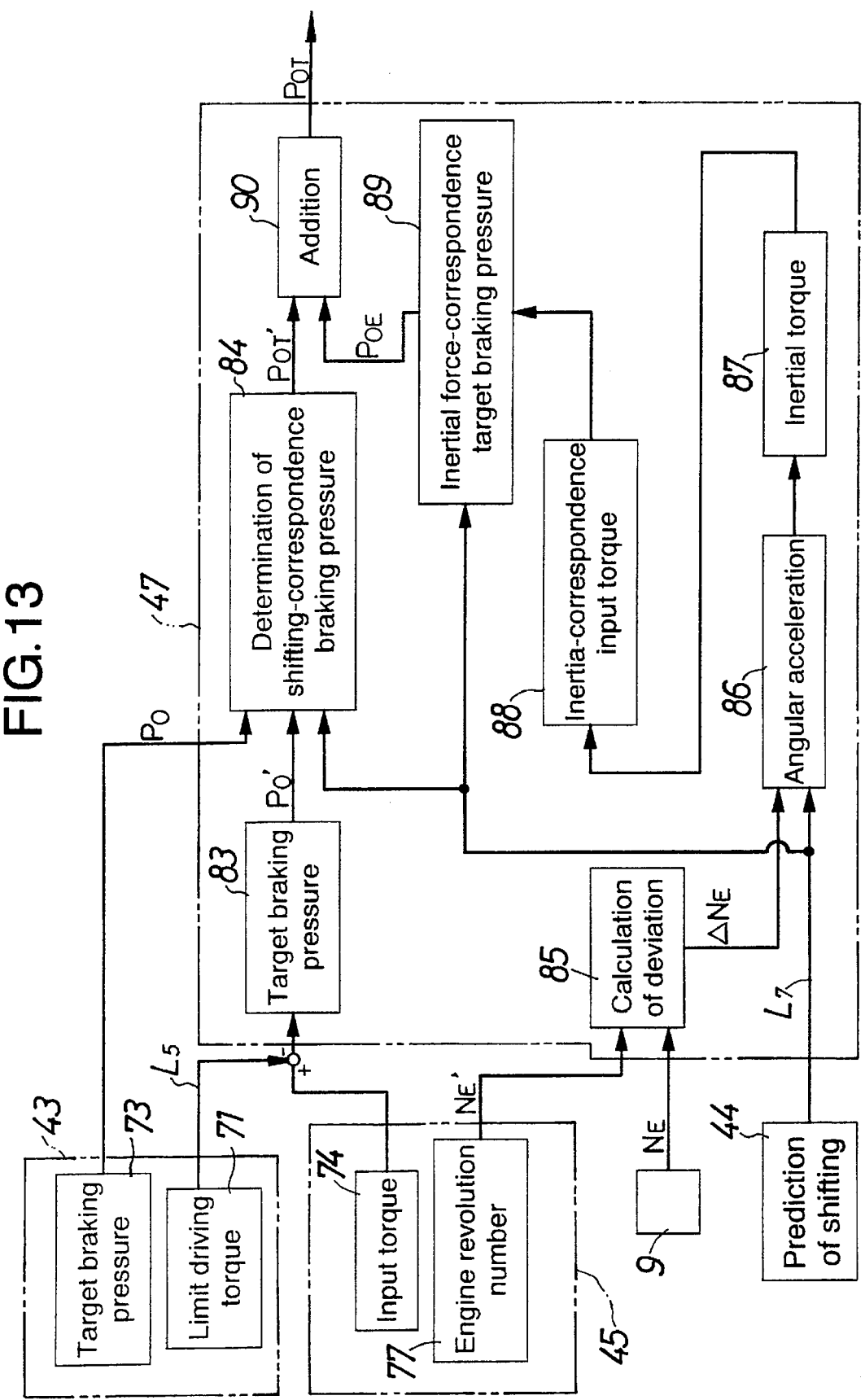

Referring to FIG. 13, the shifting-correspondence brake control section 47 determines a target braking pressure $P_{OT}$ during shifting, based on: the target braking pressure $P_O$ set in the target braking pressure setting means 73 and the limit driving torque setting means 71 in the brake control section 43 at the start of shifting; the engine revolution number $N_E$ detected by the revolution number detector 9 at the start of shifting; the input torque T' and the engine revolution number $N_E'$ calculated as the values after shifting in the input torque calculating circuit 74 and the engine revolution number calculating circuit 77 in the foreseeing means 45; and the shifting-starting time point $t_S$ and the shifting-ending time point $t_E$ received from the shifting predicting means 44 through the line $l_4$. The shifting-correspondence brake control section 47 includes an adding point 82, a target barking pressure setting means 83, a shifting-correspondence braking pressure setting means 84, a deviation calculating means 85, an angular acceleration calculating means 86, an inertial torque calculating means 87, an inertia-correspondence input torque calculating means 88, and an inertial force-correspondence target braking pressure setting means 89 and an adding means 90.

Figure 14:
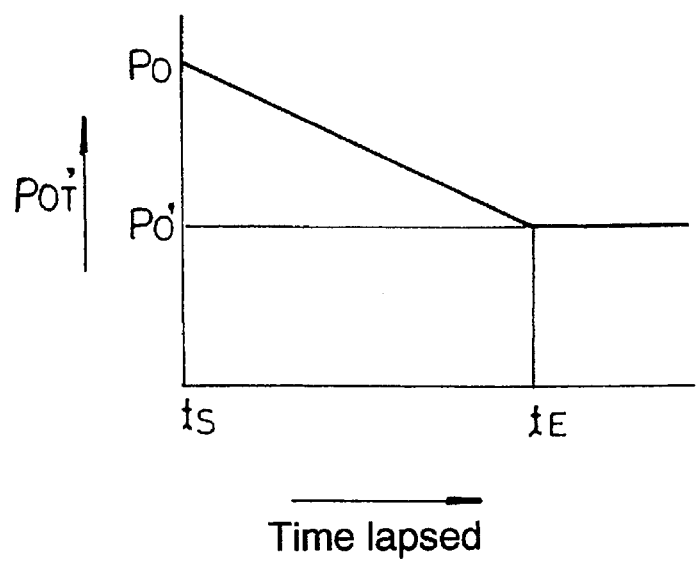

In the adding point 82, the limit driving torque received through the line $L_5$ is subtracted from the input torque T' after shifting, and a target braking pressure $P_O'$ after shifting is set in the target braking pressure setting means 83 based on an output from the adding point 82. A target braking pressure $P_{OT}'$ during shifting is set in the shifting-correspondence braking pressure setting means 84 in accordance with the target braking pressure $P_O'$, the target braking pressure $P_O$ determined in the target braking pressure determining means 73 of the brake control section 43, the shifting-starting time point $t_S$ and the shifting-ending time point $t_E$ received through the line $L_7$, as shown in FIG. 14. Specifically, the target braking pressure $P_{OT}'$ during shifting is determined, so that the target braking pressure equal to the target braking pressure $P_O$ at the shifting-starting time point $t_S$ is changed to be equal to the target braking pressure $P_O'$ at the shifting-engine time point $t_E$, and after the shifting-ending time point $t_E$, the target braking pressure is set at a value equal to $P_O'$ ($P_{OT}'=P_O'$).

In the deviation calculating means 85, a deviation $\Delta N_E$ between the engine revolution number $N_E$ detected by the revolution number detector 9 at the start of shifting and the engine revolution number $N_E'$ determined as the value after shifting in the engine revolution number calculating circuit 77 in the foreseeing means 45 is calculated. The angular acceleration calculating means 86 determines an angular acceleration produced during shifting by dividing the deviation $\Delta N_E$ between the engine revolution numbers by a time between the shifting-starting time point $t_S$ and the shifting-ending time point $t_E$ provided through the line $L_7$. An inertial driving torque of the engine E is calculated in the inertial torque calculating means 87 based on the angular acceleration and an inertial moment inherent to the engine E. Further, an input torque to the differential D corresponding to an inertia is calculated in the inertia-correspondence input torque calculating means 88 based on the inertial torque determined in the inertial torque calculating means 87 and a characteristic inherent to the torque converter 2 in the automatic transmission AT.

Figure 15:
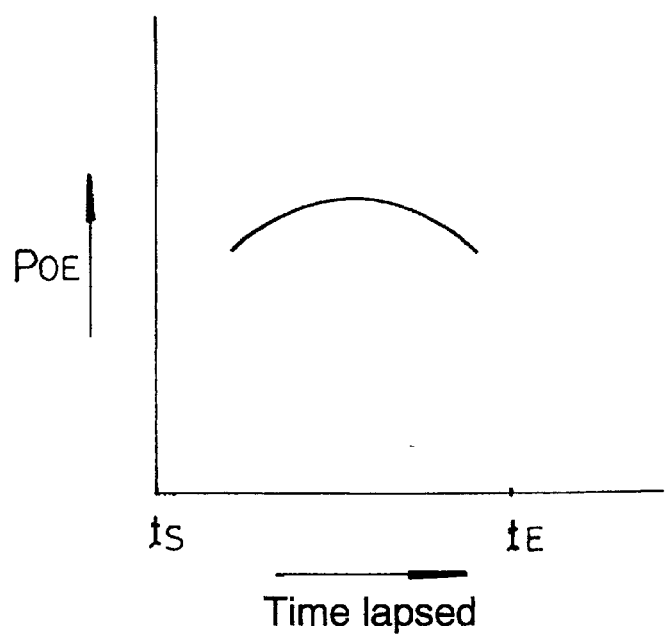

In the inertial force-correspondence input torque calculating means 89, a target braking pressure $P_E$ corresponding to the inertia-correspondence input torque determined in the inertia-correspondence input torque calculating means 88 is set in correspondence to a lapse of time between the shifting-starting time point $t_S$ and the shifting-ending time point $t_E$, as shown in FIG. 15.

In the adding means 90, the target braking pressure $P_{OE}$ corresponding to the inertia input torque determined in the inertial force-correspondence input torque calculating means 89 is added to the target braking pressure during shifting determined in the shifting-correspondence braking pressure setting means 84. A target braking pressure $P_{OT}$ during shifting determined by taking the inertia driving torque of the engine E into consideration is delivered from the adding means 90.

Referring to FIG. 3, a signal becoming a high level between the shifting-starting time point $t_S$ and the shifting-ending time point $t_E$ is delivered from the shifting predicting means 44 to the line $L_8$, and a signal from the line $L_8$ is inputted to the OR gate 49 and inputted in an inverted manner to the monostable circuit 48. An output from the monostable circuit 48 is inputted to the OR gate 49. Thus, the OR gate 49 delivers a signal which becomes a high level at the shifting-ending time point $t_E$ and becomes a low level at a time point delayed by a predetermined time from the shifting-ending time point $t_E$.

Each of the switch circuit 50 and 51 is changed in switching mode in accordance with an output from the OR gate. The switch circuit 50 is changed in switching mode, so that it permits an output from the throttle control section 42 to be inputted to the output judging circuit 52, when the output from the OR gate 49 is low level, but it permits the output from the shifting-correspondence throttle control section 46 to be inputted to the output judging circuit 52 in response to the output from the OR gate 49 becoming the high level. The switch circuit 51 is changed in switching mode, so that it permits an output from the brake control section 43 to be inputted to the output judging circuit 52, when the output from the OR gate 49 is low level, but it permits the output from the shifting-correspondence brake control section 47 to be inputted to the output judging circuit 52, in response to the output from the OR gate 49 becoming the high level.

The output judging circuit 52 selects one of signals received from the switch circuits 50 and 51 to deliver it to the step motor 5 and the linear solenoid $23_{DL}$ or $23_{DR}$ in accordance with the outputs from the slip detecting means 40, i.e., the signal from the line $L_1$ which becomes a high level when the left driven wheel $W_{DL}$ is fallen into an excessively slipping tendency, and the signal from the line $L_2$ which becomes a high level when the right driven wheel $W_{DR}$ is fallen into an excessively slipping tendency. The judgment of the output is carried out by a procedure shown in FIG. 16.

Figure 16:
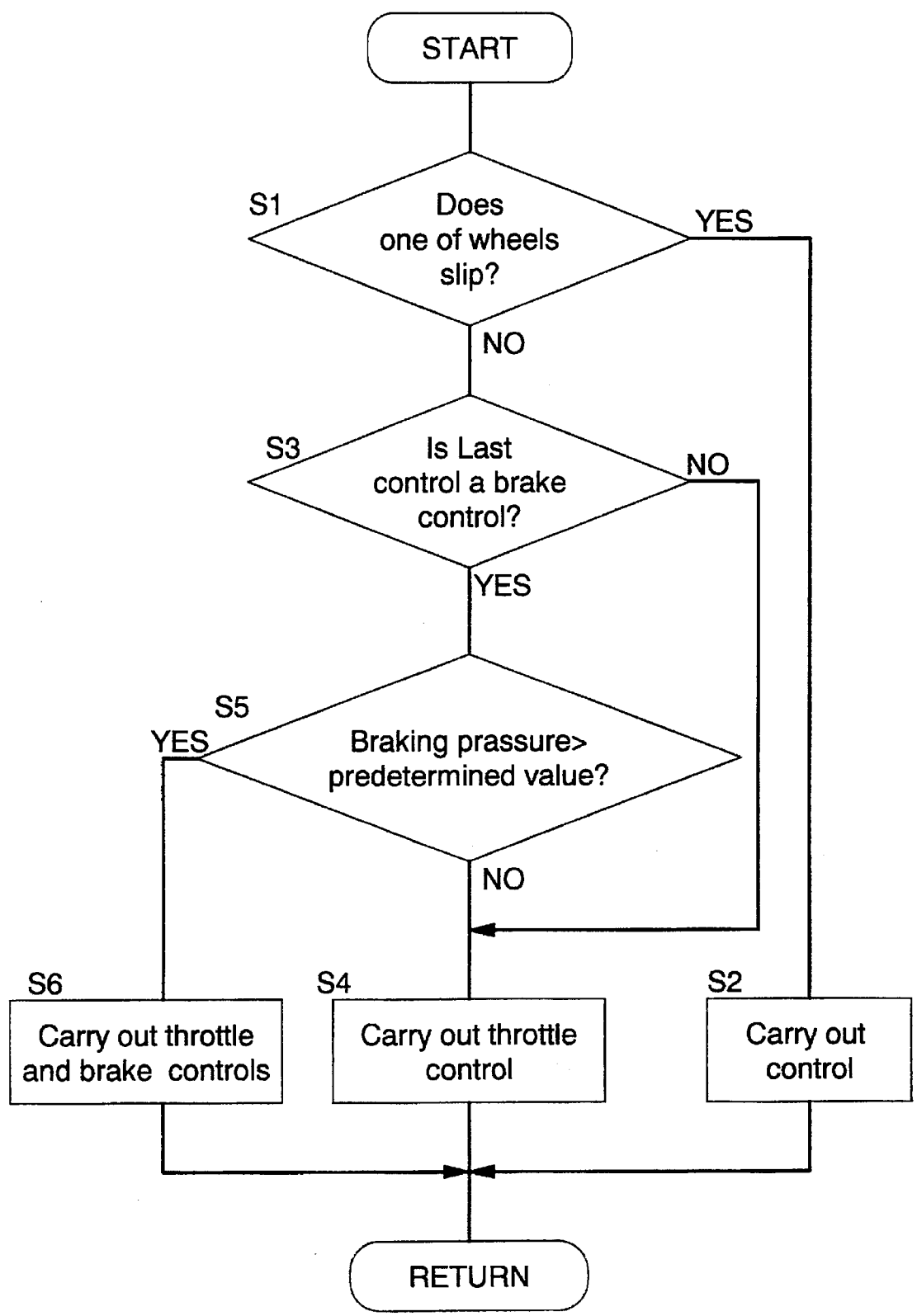

At step S1 in FIG. 16, it is judged whether one of the driven wheels $W_{DL}$ and $W_{DR}$ has an excessively slipping tendency. If on the one wheel has the excessively slipping tendency, the brake control is selected at step S2. Namely, the output from the switch circuit 51 is supplied to one of the linear solenoids $23_{DL}$ and $23_{DR}$ which corresponds to the driven wheel $W_{DL}$ or $W_{DR}$ having the excessively slipping tendency.

If NO at step S1, i.e., when it is decided that both of the driven wheels have the excessively slipping tendency, it is judged at step S3 whether the last control has been the brake control. If the last control has not been the brake control, the processing is advanced to step S4, at which the throttle control is selected. Namely, the output from the switch circuit 50 is supplied to the step motor 5.

If it is decided at step S3 that the last control has been the brake control, the processing is advanced to step S5. It is judged at step S5 whether the braking pressure exceeds a predetermined value. If the braking pressure is lower than the predetermined value, the processing is advanced to step S4. On the other hand, if it is decided that the braking pressure exceeds the predetermined value, both of the throttle control and the brake control are carried out at step S6. That is, the output from the switch circuit 50 is supplied to the step motor 5, and the output from the switch circuit 51 is supplied to the linear solenoids $23_{DL}$ and $23_{DR}$.

The operation of this embodiment will be described below. If both the driven wheels $W_{DL}$ and $W_{DR}$ have been fallen into the excessively slipping tendency during acceleration of the vehicle which is not in the course of shifting, the output judging means 52 permits the output from the switch circuit 50 to be applied to the step motor 5, and the switch circuit 50 is in the switching mode which connects the throttle control section 42 to the output judging means 52. Thus, the operation of the step motor 5 is controlled so that the throttle valve is brought into a state having the target throttle opening degree $\theta_{THO}$ which is determined based on the deviation between the current engine revolution number $N_E$ and the target engine revolution number $N_{EO}$ which is determined depending upon the a limit value of input torque to the differential D at the time when both the driven wheels $W_{DL}$ and $W_{DR}$ are fallen into the excessively slipping tendency.

When an excessively slipping tendency is produced in one of the driven wheels, e.g., in the left driven wheel $W_{DL}$ during acceleration of the vehicle which is in the shifting course, when the friction coefficient of a road surface is difference between the left and right driven wheels $W_{DL}$ and $W_{DR}$, the output judging means 52 provides the output from the switch circuit 51 to the linear solenoid $23_{DL}$, and the switch circuit 51 is in the switching mode which connects the brake control section 43 to the output judging means 52.

Figure 17:
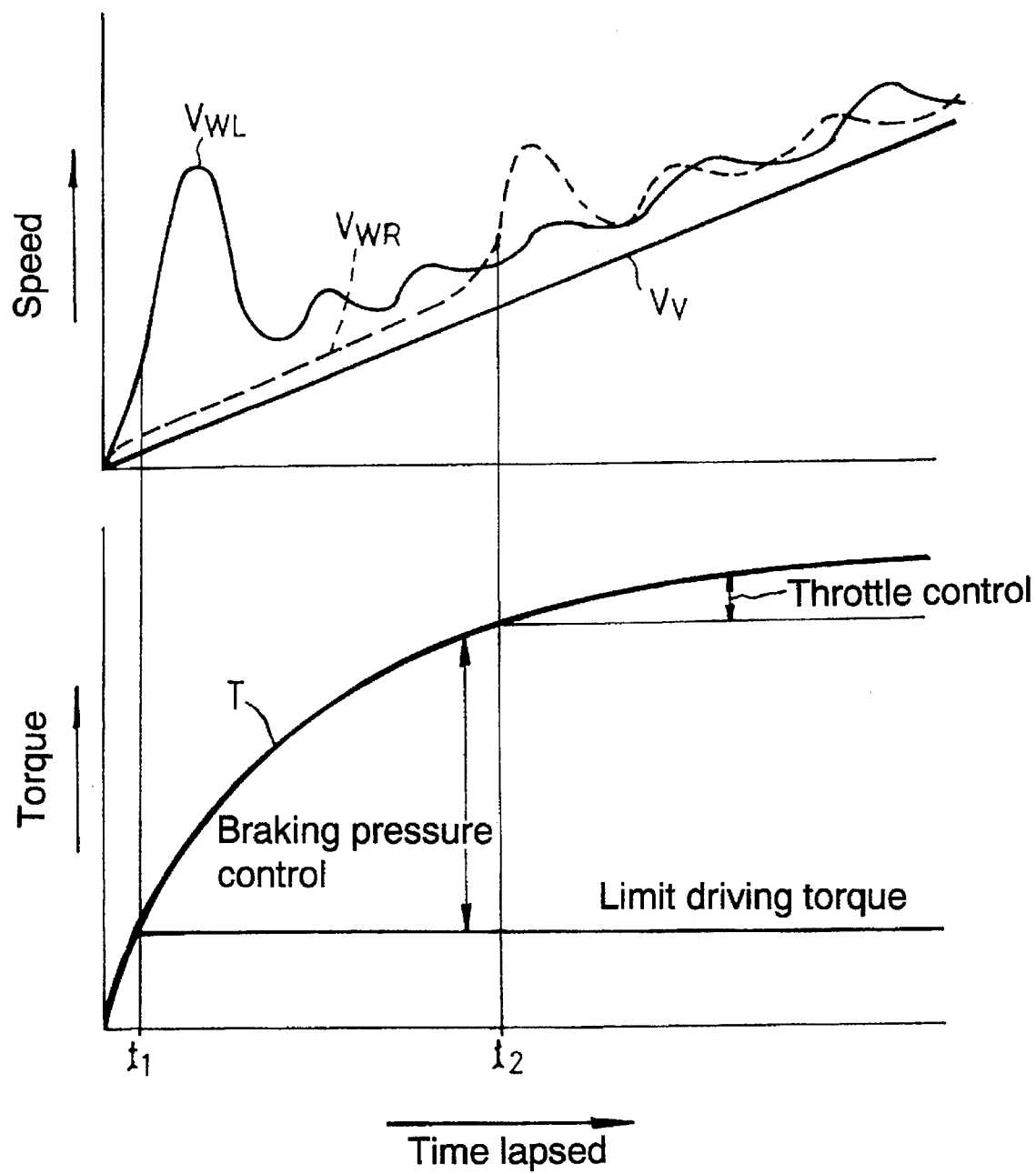

In this case, suppose that the speed $V_{WL}$ of the left driven wheel $W_{DL}$ and the speed $V_{WR}$ of the right driven wheel $W_{DR}$ are being varied, as shown in FIG. 17. When the left driven wheel $W_{DL}$ is fallen into the excessively slipping tendency at a time point $t_1$, the input torque to the differential D at that time is set as a limit driving torque in the limit driving torque setting means 41, and a difference between the limit driving torque and the current input torque detected in the input torque detecting means 41. Thus, the linear solenoid $23_{DL}$ is operated so that a toque corresponding to the difference is a braking torque to be applied to the left driven wheel $W_{DL}$. In this manner, by carrying out the brake control based on the driving torque before appearing as a wheel speed, a loop in the control system can be reduced in size, as compared with the prior art in which the brake control causing the wheel speed to become equal to a target value is carried out. This makes it possible to decrease indeterminate transmitting elements and to provide improvements in control responsiveness and in hysteresis characteristic.

If the braking pressure exceeds the predetermined value when both the driven wheels $W_{DL}$ and $W_{DR}$ are fallen into the excessively slipping tendency at a time point $t_2$, the throttle control is also carried out in addition to the brake control.

When the shifting of the automatic transmission is carried out during execution of the traction control based on the fact that both or either one of the driven wheels $W_{DL}$ and $W_{DR}$ have the excessively slipping tendency, gear positions at the shifting-starting and ending time points $t_S$ and $t_E$ and after the shifting are predicted by the shifting predicting means 44, and an input torque T', an engine revolution number $N_E'$ and an engine output torque $T_E'$ are assumed as values after the shifting in accordance with the predicted gear positions. An ideal driving torque after the shifting for the driven wheels $W_{DL}$ and $W_{DR}$ is calculated in the shifting-correspondence throttle control section and the shifting-correspondence brake control section 47 based on these assumed input torque T', engine revolution number $N_E'$ and engine output torque $T_E'$ and the gear position after the shifting, and at least one of the throttle control and the brake control is carried out. Thus, by carrying out at least one of the throttle control and the brake control during shifting, so that the driven wheel speeds after the shifting are stabilized, it is possible to carry out a traction control stabilized as a result of the suppression of a variation in driven wheel speeds which may be caused with the shifting motion of the automatic transmission AT.

In addition, in the brake control during shifting, a control quantity is determined taking an inertial force of the engine E into consideration and hence, a more stable traction control can be carried out.

Although the embodiment of the present invention has been described in detail, it will be understood that the present invention is not limited to the above-described embodiment, and various modifications in design may be made without departing from the spirit and scope of the invention defined in claims.

For example, although the input torque to the differential at the time when one of the driven wheels is fallen into the excessively slipping tendency is maintained constant and determined as the limit driving torque in the above-described embodiment, the limit driving torque may be varied with a variation in the input torque to the differential.

What is claimed is:

1. A traction control device for a vehicle, which decreases a driving torque for a driving wheel connected to a power source through an automatic transmission in response to the detection of an excessively slipping tendency of the driving wheel at the time of acceleration of the vehicle, said traction control device comprising:

a gear shift position detecting means for detecting the shift stage of said automatic transmission;

a shifting predicting means for predicting the shifting motion of said automatic transmission based on an operational parameter of said power source and a shifting characteristic of said automatic transmission;

a foreseeing means for foreseeing the operational parameter of said power source after shifting, based on values before shifting of the operational parameter of said power source and operational parameter of the vehicle and the gear shift positions of said automatic transmission before and after shifting;

a driving torque control section for determining a control quantity of the driving torque for the driving wheel, based on detection values before shifting and a foreseen value after shifting of the operational parameter of said power source; and an actuator operated in accordance with the control quantity determined in said driving torque control section to change the driving torque for the driving wheel.

* * * * *